United States Patent [19]

Sprouse et al.

[11] Patent Number: 5,101,888

[45] Date of Patent: Apr. 7, 1992

[54] HEAT PIPE SYSTEMS

[75] Inventors: Kenneth M. Sprouse, Northridge; Adon Delgado, Jr., Canoga Park, both of Calif.

[73] Assignee: Rockwell International Corporation, Seal Beach, Calif.

[21] Appl. No.: 620,990

[22] Filed: Dec. 3, 1990

[51] Int. Cl.$^5$ .......................................... F28D 15/02
[52] U.S. Cl. ........................ 165/104.26; 165/104.13; 252/67
[58] Field of Search ...................... 165/104.13, 104.12, 165/104.21, 104.26

[56] References Cited

U.S. PATENT DOCUMENTS 4,336,837  6/1982  Koeniz .
4,585,569  4/1986  Powell .

FOREIGN PATENT DOCUMENTS 35823  3/1980  Japan ............................ 165/104.13

Primary Examiner—Albert W. Davis, Jr.
Attorney, Agent, or Firm—H. Fredrick Hamann; Harry B. Field; David C. Faulkner

[57] ABSTRACT

A heat pipe system is provided in which the working fluid is selected to enhance operation of the heat pipe by utilizing a salt compound having a boiling point of about 600° K. at one atmosphere.

3 Claims, 1 Drawing Sheet

HEAT PIPE SYSTEMS

TECHNICAL FIELD

This invention relates generally to heat pipe systems and specifically to working fluids utilized therein.

BACKGROUND OF THE INVENTION

Prior heat pipe applications have utilized mercury as a thermal energy transfer working fluid in both the gaseous and liquid phases for operating temperatures between 500° K. to 800° K.

However, mercury has a high toxicity and is quite corrosive with respect to heat pipe components.

DISCLOSURE OF THE INVENTION

The present invention provides a heat pipe in which operative working fluids may be utilized which exhibit improved functionality, decreased toxicity, and substantially less corrosiveness when compared with mercury.

It is an object of the present invention to provide improved working fluids for use in a heat pipe system, so as to enhance the operativeness of the system.

Another object of the present invention is to provide a working medium or fluid utilized in a heat pipe which is characterized by a low toxicity and corrosive factor during functioning of the heat pipe system.

These and other objects and features of the present invention will be apparent from the following detailed description when considered in connection with the accompanying drawing.

Figure 1:
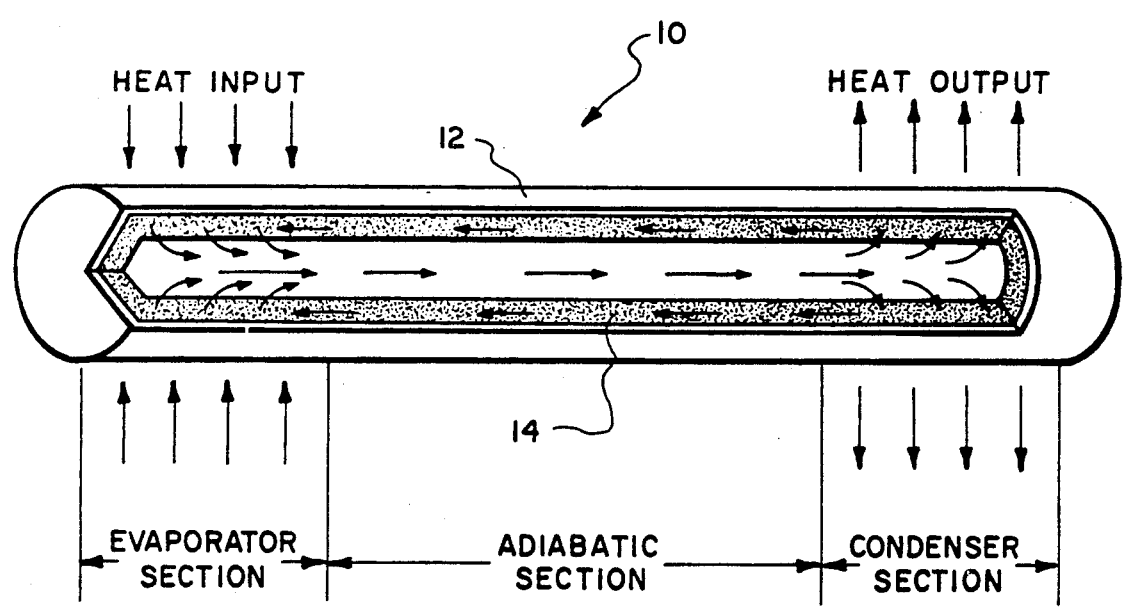
FIG. 1 is a perspective view of a heat pipe which may be functioned utilizing the working fluids of the present invention.

Referring now to the drawing, there is shown a heat pipe 10, comprising a closure tube or chamber 12 whose inner surface is lined with a capillary wick 14.

Wick 14 is composed of materials which are compatible with the selected working fluid. For example, 100 percent sulfuric acid is probably limited to utility with an iron wick whereas aluminum triiodide working fluids can function with iron, nickel, and/or zirconium wicks. In operation, wick 14 contains the liquid phase of a working fluid and the remaining volume of the closed tube 12 contains the vapor phase. Heat applied at the evaporator section by an external source vaporizes the working fluid in that section. The resulting difference in pressure drives vapor from the evaporator section to the condenser section (as indicated by the arrows) where it condenses. Depletion of liquid by evaporation causes a liquid-vapor interphase in the evaporator section to enter into the wick's surface and a capillary pressure develops. This capillary pressure pumps the condensed liquid back to the evaporator section for re-evaporation.

As previously indicated, mercury has been used as a working fluid in heat pipes. The present invention provides for thermal energy transfer from the evaporator section to a condenser section by means of a working fluid which fluid is a salt compound having a boiling point of about 600° K. at one atmosphere.

More specifically, the working fluids of the present invention include mercury dibromide, aluminum tribromide antimony tribromide, titanium tetrabromide, niobium pentabromide, tungsten pentabromide, molybdenum pentachloride, tungsten hexachloride, mercury diodide, aluminum triodide, silicon tetraiodide, titanium tetraiodide, and antimony pentaiodide. In addition to the aforementioned working fluids, it has also been determined that tetraphosphorus trisulfide, as well as 100% sulfuric acid, may be utilized in accordance with the present invention with superior results as compared to utilizing mercury as the working fluid. By way of example and not limitation, the comparison of Table 1 hereinbelow provides comparison data as between mercury, aluminum triodide, tetraphosphorus trisulfide and sulfuric acid.

TABLE 1

| Fluid | Boiling Temp (°K.) | ($T_{cs}$) (°K.) | $M_G$ | $M_L$ | $M_{In}$ |
|---|---|---|---|---|---|
| Mercury, Hg | 630 | 7,115 | $6.2 \times 10^8$ | $1.8 \times 10^{12}$ | 434 |
| Aluminum Triiodide | 633 | 7,189 | $3.1 \times 10^8$ | $1.1 \times 10^{10}$ | 0.0 |
| Tetraphoshorus Trisulfide | 680 | 7,200 | $5.6 \times 10^8$ | $9.6 \times 10^{10}$ | 1.7 |
| Sulfuric Acid | 609 | 6,742 | $8.5 \times 10^8$ | $6.5 \times 10^9$ | 4.5 |

In the above table, a characteristic saturation temperature, $T_{cs}$, a gaseous transport factor, $M_G$, a liquid transport factor, $M_L$, and a toxic inhalation factor, $M_{In}$, are defined by the following equations:

$$T_{cs} = \frac{\Delta H_v}{R}$$

and:

$$M_B = \rho_G \Delta H_v 3/2$$

and:

$$M_L = \frac{\rho L \, \sigma L \, \Delta H_v}{\mu_L}$$

and:

$$M_{In} = \frac{\rho_{sat}}{\rho_{PEL}}$$

where the working fluid properties used to define the above listed heat pipe performance parameters are: the latent heat of vaporization, $\Delta H_v$; the gas constant, R; the gas density at 1 atm pressure and boiling temperature, $\rho_G$; the liquid density, $\rho_L$; the liquid surface tension at boiling, $\sigma_L$; the liquid dynamic viscosity at boiling $\mu_L$; the saturated vapor density in air at STP, $\rho_{sat}$; and the OSHA permissible exposure limit (PEL) concentration, $\rho_{PEL}$. The performance parameters of Table 1 show the similarity of these fluids with mercury in terms of heat pipe operation except for the substantial and beneficial differences in toxic inhalation.

While select comparison of the above-noted working fluids have ben provided, obviously modifications and variations are possible in light of the above description. It is therefore to be understood that within the scope of the appended claims, the invention may be practiced otherwise than as specifically described.

What is claimed and desired to be secured by Letters Patent of the United States:

1. In a heat pipe including an inner surface lined with a wick, providing for thermal energy transfer from an evaporator section to a condenser section of said pipe by mans of a working fluid associated with said wick, wherein said working fluid is a salt compound having a boiling point of from about 600° K. to 680° K. at 1 atmosphere.

2. In a heat pipe including an inner surface lined with a wick, providing for thermal energy transfer from an evaporator section to a condenser section of said piper by means of a working fluid wherein said working fluid is selected from the group consisting of mercury dibromide, aluminum tribromide, antimony tribromide, titanium tetrabromide, niobium pentabromide, tungsten pentabromide, molybdenum pentachloride, tungsten hexachloride, mercury diodide, aluminum triodide, silicon tetraiodide, titanium tetraiodide, and antimony pentaiodide.

3. The heat pipe of claim 1 wherein the working fluid is tetraphosphorus trisulfide.

* * * * *